United States Patent
Shoji et al.

[11] Patent Number: 6,055,469
[45] Date of Patent: Apr. 25, 2000

[54] FAULT DETERMINING DEVICE FOR TORQUE TRANSMISSION STATE SENSOR, AND ENGINE MISFIRING DIAGNOSIS DEVICE

[75] Inventors: Makoto Shoji, Atsugi; Masato Kobayashi, Yokohama, both of Japan

[73] Assignee: Nissan Motor Co., Ltd., Kanagawa, Japan

[21] Appl. No.: 08/886,003

[22] Filed: Jul. 3, 1997

[51] Int. Cl.[7] ................................. G06F 19/00
[52] U.S. Cl. ..................... 701/34; 701/29; 701/107
[58] Field of Search ..................... 701/29, 34, 51, 701/62, 105, 107; 307/10.6, 139; 477/125, 99, 906; 123/414, 479

[56] References Cited

U.S. PATENT DOCUMENTS

| | | | |
|---|---|---|---|
| 4,363,249 | 12/1982 | Stugart | 477/99 |
| 4,495,457 | 1/1985 | Stahl | 701/62 |
| 4,642,771 | 2/1987 | Asagi et al. | 701/62 |
| 4,702,127 | 10/1987 | Cote | 701/62 |
| 4,960,092 | 10/1990 | Sasaki et al. | 123/414 |
| 5,442,550 | 8/1995 | Tasky et al. | 701/62 |
| 5,481,906 | 1/1996 | Nagayoshi et al. | 701/34 |
| 5,778,330 | 7/1998 | McKee | 701/62 |
| 5,809,441 | 9/1998 | McKee | 701/62 |

FOREIGN PATENT DOCUMENTS 4-113244 4/1992 Japan .

*Primary Examiner*—Gary Chin
*Attorney, Agent, or Firm*—McDermott, Will & Emery

[57] ABSTRACT

A sensor which detects whether or not an engine output shaft and a vehicle drive shaft are in a predetermined connection state, is subjected to a fault determination when a predetermined condition holds. When the engine output shaft and vehicle drive shaft are constantly in this connection state from when the engine starts to when the above condition comes to hold, it is determined that a fault has occurred in the sensor. It is also determined whether or not the vehicle is running when the engine starts, and when the vehicle is running when the engine starts, fault determination is prohibited so as to avoid incorrect results.

8 Claims, 6 Drawing Sheets

FAULT DETERMINING DEVICE FOR TORQUE TRANSMISSION STATE SENSOR, AND ENGINE MISFIRING DIAGNOSIS DEVICE

The contents of Tokugan Hei 8-173805, with a filing date of Jul. 3, 1996 in Japan, on which the content and claim for priority of this application are based, are hereby incorporated by reference.

FIELD OF THE INVENTION

This invention relates to a diagnostic arrangement for detecting a fault in a device which is used for detecting a state of torque transmission from an engine output shaft to a vehicle drive shaft, and which may be used for diagnosing misfiring of the engine.

BACKGROUND OF THE INVENTION

Since 1994, it has been obligatory for vehicles manufactured in the United States to be fitted with an On Board Diagnosis (OBD) II fault diagnosis device to prevent worsening of noxious exhaust emissions due to vehicle aging. One of these devices, which detects misfiring of an engine, is disclosed in Tokkai Hei 4-113244. This device is provided with a magnetic pickup that reacts to the passage of teeth on a ring gear connected to the crankshaft of the engine, detects variations in the rotation speed of the ring gear from the output signal, and thereby tests whether or not misfiring has occurred.

The rotation speed of the ring gear largely varies depending on, for example, whether or not drive torque is being transmitted from the engine output shaft to the vehicle drive shaft, so to avoid false conclusions, the test is performed when for example the neutral switch is in the OFF position.

When the transmission is in the neutral position, i.e. when rotation is not being transmitted from the engine output shaft to the vehicle drive shaft, the neutral switch outputs an ON signal, and in other cases it outputs an OFF signal.

When misfiring is diagnosed only when the neutral switch is OFF, it is necessary to determine that the neutral switch is not faulty before performing an analysis of ignition failure.

This determination of whether the neutral switch is faulty is made by determining whether or not an ON signal is output by the neutral switch during a period from when the starter switch changes over from ON to OFF, i.e. from engine startup, to when the misfiring diagnosis is performed.

When the engine is started, the engine output shaft and the vehicle drive shaft are not connected. i.e., the transmission should be in the neutral position. Hence, if the neutral switch does not switch ON even once during the period from engine startup to when the misfiring diagnosis is performed, it is determined that the neutral switch has a fault.

However, when the engine is restarted while the vehicle is running (e.g., coasting downhill), the transmission may be in the driving range from startup to when the misfiring diagnosis is performed.

In this case, if the neutral switch fault test is made by the aforesaid determining algorithm, it is incorrectly determined that the neutral switch has a fault even when it is functioning correctly.

A lockup switch may be used instead of the neutral switch in order to detect the state of torque transmission from the engine output shaft to the vehicle drive shaft.

The lockup switch outputs an ON signal when the engine output shaft and the transmission are directly connected mechanically without the intervention of a fluid clutch, on torque converter and in other cases it outputs an OFF signal.

However, if an algorithm is used which determines that the lockup switch is faulty if it does not output an OFF signal even once from startup to when the misfiring diagnosis is performed, the determination will again be incorrect as in the case of the neutral switch.

SUMMARY OF THE INVENTION

It is therefore an object of this invention to prevent an incorrect determination in fault determination of these torque transmission state detection sensors.

In order to achieve the above object, this invention provides a device for fault determining a sensor for detecting whether or not a vehicle engine output shaft and a vehicle drive shaft are in a predetermined drive connection state and outputting a signal indicative thereof.

The device comprises a mechanism for determining whether or not a predetermined fault determining condition exists, a mechanism for determining from said signal whether or not the engine output shaft and the vehicle drive shaft were constantly in drive connection from the time when the engine started to the time when the above mentioned condition came into existence, a mechanism for determining that a fault has occurred in the sensor under examination when the engine output shaft and the vehicle drive shaft were indicated as being constantly in the drive connection state from the time when the engine started to the time when the fault determining is indicated as having come into existence, a mechanism for determining whether or not the vehicle is running, and a mechanism for prohibiting fault determining by the fault determining mechanism when the vehicle was running when the engine was started.

It is preferable that the vehicle running determining mechanism comprises a mechanism for detecting vehicle speed, and a mechanism for determining that the vehicle is not running when the vehicle speed is less than a predetermined value.

It is also preferable that the vehicle comprises a transmission for selectively shifting between a running position in which a rotation of the engine output shaft is transmitted to the vehicle drive shaft, and a neutral position in which the rotation of the engine output shaft is not transmitted to the vehicle drive shaft, and wherein the sensor comprises a switch which responds to the transmission being in the neutral position.

It is also preferable that the vehicle comprises a lockup clutch for mechanically connecting the engine output shaft and an input shaft of an automatic transmission and the sensor comprises a switch which responds according to whether or not the lockup switch is mechanically connecting the engine output shaft and the transmission input shaft.

This invention also provides an engine misfiring diagnosis device for measuring a time required for the engine to rotate through a predetermined angle corresponding to a combustion process of the engine, and determining engine misfiring based on a variation of the required time.

The device comprises a mechanism for determining whether or not an engine output shaft and a vehicle drive shaft are in a predetermined state of drive connection and outputting a signal indicative thereof, a mechanism for determining whether or not a predetermined fault determining condition exists, a mechanism for determining from said signal whether or not the engine output shaft and the drive vehicle drive shaft were constantly in the connection state from the time when the engine started to the time when the condition suitable for fault detection came into existence, a mechanism for determining that a fault has occurred in the sensor when the engine output shaft and the vehicle drive shaft are indicated as being constantly in the connection state from the time when the engine started to the time when the condition came into existence, a mechanism for prohibiting the engine misfiring determining when a fault has occurred in the sensor, a mechanism for determining whether or not the vehicle is running, and a mechanism for prohibiting fault determining by the fault determining mechanism when the vehicle is indicated as having been running (moving) when the engine started.

It is preferable that the vehicle running determining mechanism comprises a mechanism for detecting vehicle speed, and a mechanism for determining that the vehicle is not running when the speed is less than a predetermined value.

It is also preferable that the vehicle comprises a transmission for selectively shifting between a running position in which a rotation of the engine output shaft is transmitted to the vehicle drive shaft, and a neutral position in which the rotation of the engine output shaft is not transmitted to the vehicle drive shaft, and wherein the sensor comprises a switch which responds according to whether or not the transmission is in the neutral position.

It is also preferable that the vehicle comprises a lockup clutch for mechanically connecting the engine output shaft and a transmission input, and the sensor comprises a switch which responds according to whether or not the lockup clutch is mechanically connecting the engine output shaft and the transmission input shaft.

The details as well as other features and advantages of this invention are set forth in the remainder of the specification and are shown in the accompanying drawings.

DESCRIPTION OF THE PREFERRED EMBODIMENTS

Figure 1:
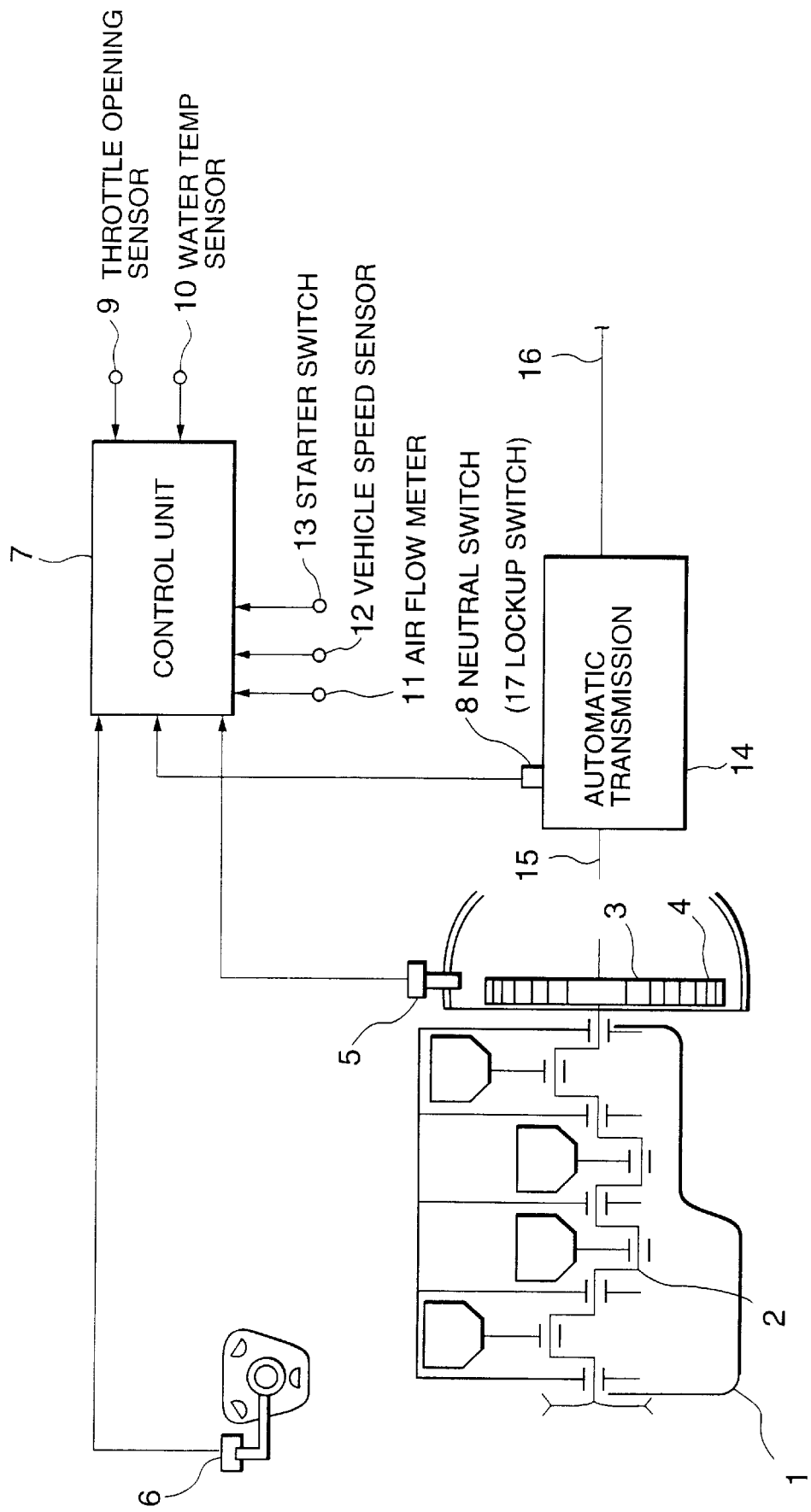
FIG. 1 is a schematic diagram of a misfiring diagnosis device according to this invention.

Referring to FIG. 1 of the drawings, an output shaft 15 is directly connected to a crankshaft 2 of a vehicle engine 1. The rotation of the output shaft 15 is transmitted to a drive shaft 16 via an automatic transmission 14. The automatic transmission 14 is provided with a hydraulic clutch (torque converter) 14, the rotation of the output shaft 15 being transmitted to the drive shaft 16 while the gear ratio of the transmission 14 is varied according to the engine running conditions. When the driver selects a neutral position by operating a shift lever, the output shaft 15 is no longer in drive connection with the drive shaft 16. A flywheel 3 is attached to one end of the crank shaft 2, and a ring gear 4 is formed on the outer circumference of this wheel. A magnetic pickup 5 comprising an iron core and a coil is provided facing the tooth surface of the ring gear 4 so as to detect the rotation speed of the ring gear 4. The operation of this magnetic pickup 5 is as follows.

The tooth surface which rotates together with the ring gear 4 cuts the magnetic field generated by the iron core of the magnetic pickup 5. The magnetic force in the coil of the magnetic pickup 5 therefore fluctuates, and the fluctuation induces an alternating current. After this alternating current is converted to a rectangular wave pulse indicating ON and OFF in a control unit 7 for diagnosing misfiring of the engine 1, it is used as a crank angle signal (Pos signal).

A crank angle sensor 6 of the kind known in the art is provided facing a cam shaft, not shown, driven by the crankshaft 2. The signal output by this crank angle sensor 6 is used as a reference signal (Ref signal) by the control unit 7.

The control unit 7 measures the time required for the crankshaft 2 to rotate through a predetermined angle starting from the time at which a predetermined number of Pos signals have been counted from when the Ref signal is input. This predetermined time is referred to as a crank angle interval TINT for determining misfiring.

During the time that the crankshaft 2 performs one rotation, the control unit 7 measures the crank angle interval TINT twice for a four-cylinder engine and three times for a six cylinder engine. A predetermined number of TINT are then sampled from the most recent value to when ignition occurred a plurality of previous occasions beforehand, an ignition failure parameter is computed from this predetermined number of TINT, and ignition failure is determined by comparing this ignition failure parameter with a predetermined determining value. This type of misfiring determining algorithm is known for example from Tokkai Hei 4-113244, and its discussion will therefore be omitted herein.

A misfiring determination is not performed frequently, but only when predetermined determining conditions exist. To determine these conditions, signals are input to the control unit 7 from a throttle opening sensor 9 which detects a throttle opening, a water temperature sensor 10 which detects an engine cooling water temperature, an air flow meter 11 which detects an engine intake air volume, a vehicle speed sensor 12 which detects a vehicle running speed, a starter switch 13 which starts a starter motor of the engine 1, and a neutral switch 8. A lockup switch 17 may be used instead of the neutral switch 8.

Figure 2:
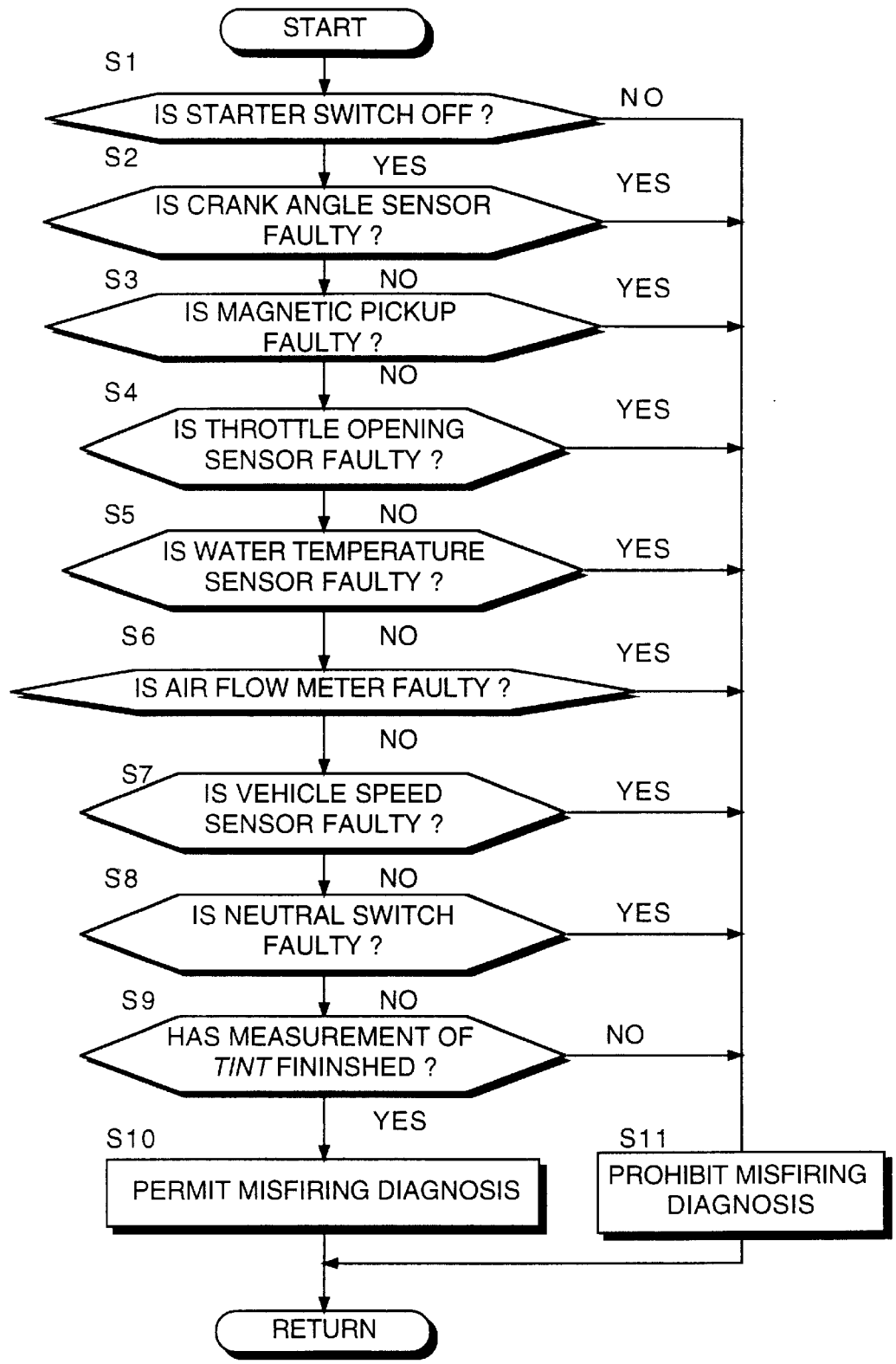
FIG. 2 is a flowchart describing a process for determining misfiring diagnosis conditions performed by the misfiring diagnosis device.

The control unit 7 permits misfiring diagnosis only when all the conditions of steps S1–S9 in the flowchart of FIG. 2 are satisfied, and prohibits the diagnosis even if only one condition is not satisfied.

These conditions are that the starter switch 13 is OFF (step S1), the crank angle sensor 6 is not faulty (step S2), the magnetic pickup 5 is not faulty (step S3), the throttle opening sensor 9 is not faulty (step S4), the water temperature sensor 10 is not faulty (step S5), the air flow meter 11 is not faulty (step S6), the vehicle speed sensor 12 is not faulty (step S7), the neutral switch 8 is not faulty (step S8), and the measurement of TINT has been completed.

When all these conditions are satisfied, the control unit 7 permits misfiring diagnosis in a step S10, otherwise even if only one of the conditions is not satisfied, the routine jumps to a step S11 and the diagnosis is prohibited.

Next, the process of determining a fault in the neutral switch 8 performed by the control unit 7 will be described. This routine is performed at a fixed interval after the vehicle ignition switch has changed over from OFF to ON.

Figure 3:
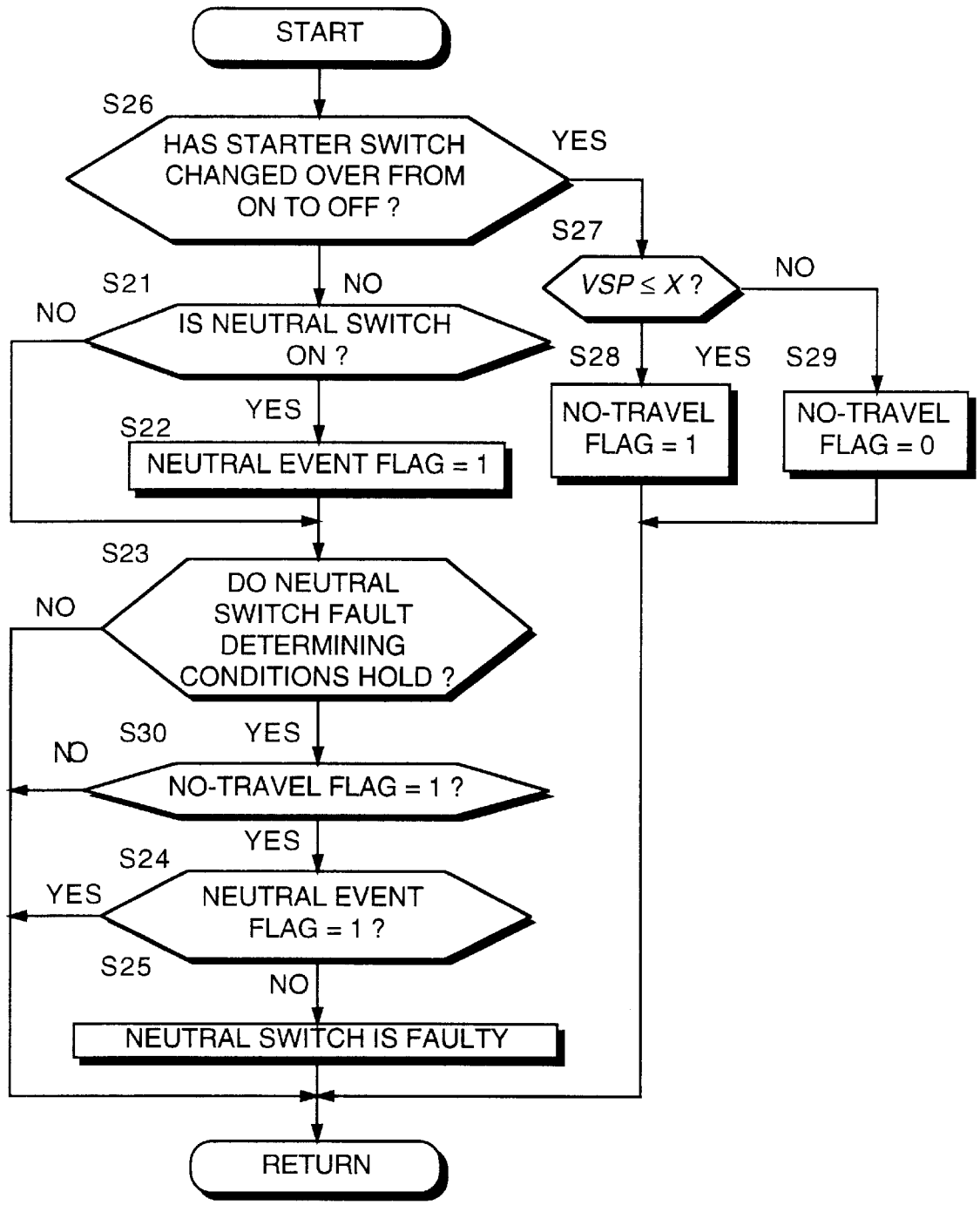
FIG. 3 is a flowchart describing a neutral switch fault testing process performed by the misfiring diagnosis device.

In FIG. 3, steps S21, S22, S23, S24, S25 comprise the process for determining a fault in the neutral switch according to the prior art, while steps S26–S30 are new steps according to this invention.

First, in the step S26, it is determined whether or not the starter switch 13 has changed over from ON to OFF. This step determines whether or not the engine 1 has just completed startup.

When startup has just been completed, a vehicle speed VSP is compared with a predetermined value X in the step S27. X is set to for example, 4 km/hr. When VSP is equal to or less than 4 km/hr, a no-travel flag is set to "1" in the step S28. This flag shows that startup of the engine 1 has occurred when the vehicle is effectively at rest. The no-travel flag is reset to "0" when the starter switch 13 is changed over from ON to OFF. When the engine is started up while the vehicle is running at a speed faster than 4 km/hr, the no-travel flag is held at "0" in the step S29.

It is only in the first process after engine startup that the determining result of the step S26 is affirmative, i.e., it is determined that the engine 1 has just started up.

When the second and subsequent processes are executed, the determining result of the step S26 is always negative, so the routine always proceeds to the step S21. The no-travel flag set in the step S28 or S29 is therefore held at the same value without change until the engine 1 is stopped and restarted.

In the step S21, it is determined whether or not the neutral switch is ON, i.e. whether or not the output shaft 15 of the engine 1 and the drive shaft 16 are disengaged. When the neutral switch 8 is ON, i.e. when the output shaft 15 and the drive shaft 16 are disengaged, the routine proceeds to the step S22 and a neutral event flag is set to "1". When the starter switch 13 is switched ON, this neutral event flag is simultaneously reset to "0", and is then set to "1" when the neutral switch 8 is switched ON. When the neutral switch 8 is OFF, i.e. when the rotation of the output shaft 15 is transmitted to the drive shaft 16, the routine proceeds directly to the step S23 without passing via the step S22.

In the step S23, it is determined whether or not the neutral switch fault determining conditions exist. These conditions are set for example as follows.

(1) The vehicle speed is equal to or greater than a predetermined value (e.g. 70 km/hr), and (2) Condition (1) is satisfied for a predetermined delay time.

Other conditions such as that the engine rotation speed is within a predetermined range, the engine load is within a predetermined range and the cooling water temperature is equal to or greater than a predetermined value, i.e., warmup is complete, may be added to condition (1).

When all the above conditions hold, the routine proceeds to a step S30. When any of the conditions does not hold, the process is terminated without performing a fault determination on the neutral switch 8.

In the step S30, it is determined whether or not the no-travel flag is "1". When the no-travel flag is "1", the routine proceeds to the step S24. When the no-travel flag is "0", it indicates that the engine was not started while the vehicle was at rest. In this case, the process is terminated without performing a fault determination on the neutral switch 8.

In the step S24, it is determined whether or not the neutral event flag is "1". When the neutral event flag is not "1", the routine proceeds to the step S25 and it is determined that there is a fault due to a break in the wiring of the neutral switch.

When the engine is started from when the vehicle is at rest, the shift lever is put in the neutral position, the engine is started, and after startup the shift lever is changed over to a driving range.

The neutral switch 8 therefore remains in the ON state for some time after the starter switch 13 has changed over from ON to OFF, and consequently, the neutral event flag is "1". Hence when the neutral event flag is "1" in the step S24, it is determined that the neutral switch 8 is functioning correctly. In this case, the process is terminated.

When the neutral event flag is "0", the neutral switch 8 has not switched ON even once after the starter switch 13 has changed over from ON to OFF. Therefore when the neutral event flag is "0" in the step S24, it is determined in the step S25 that a fault has occurred due to a break in the wiring of the neutral switch 8. The above determination of the step S24 is performed only when the no-travel flag is "1" in the step S30.

Figure 4:
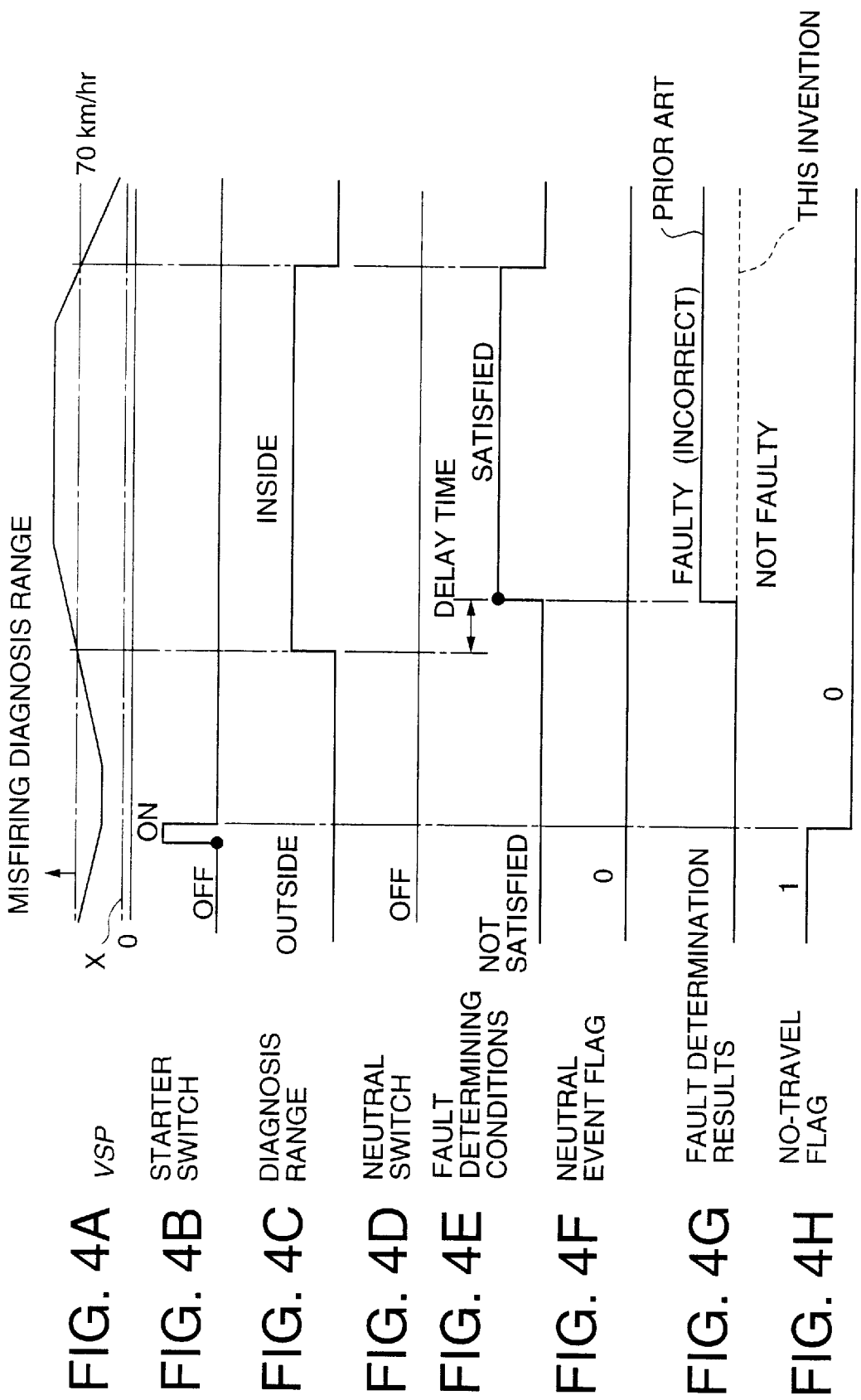
FIGS. 4A–4H are timing charts comparing results obtained by the aforesaid fault determining process and results obtained according to the prior art when an engine that has stopped during vehicle travel is restarted.

As shown in FIGS. 4A and 4B, when the engine is restarted while the vehicle is running, the vehicle speed VSP exceeds the predetermined value X in the determination of the step S27 immediately after startup, so the no-travel flag is held at "0" as shown in FIG. 4H.

As a result, the determining result of the step S30 is always negative until the engine again stops, and fault determination of the neutral switch 8 is not performed regardless of any change in the neutral event flag shown in FIG. 4F. Hence it is never incorrectly determined that a fault has occurred in the neutral switch 8.

On the other hand in the prior art process for fault determination of the neutral switch, there is no setting or determination of the no-travel flag, so when the engine is restarted while the vehicle is running, an incorrect determination may be made as shown by the broken line in FIG. 4G.

Figure 5:
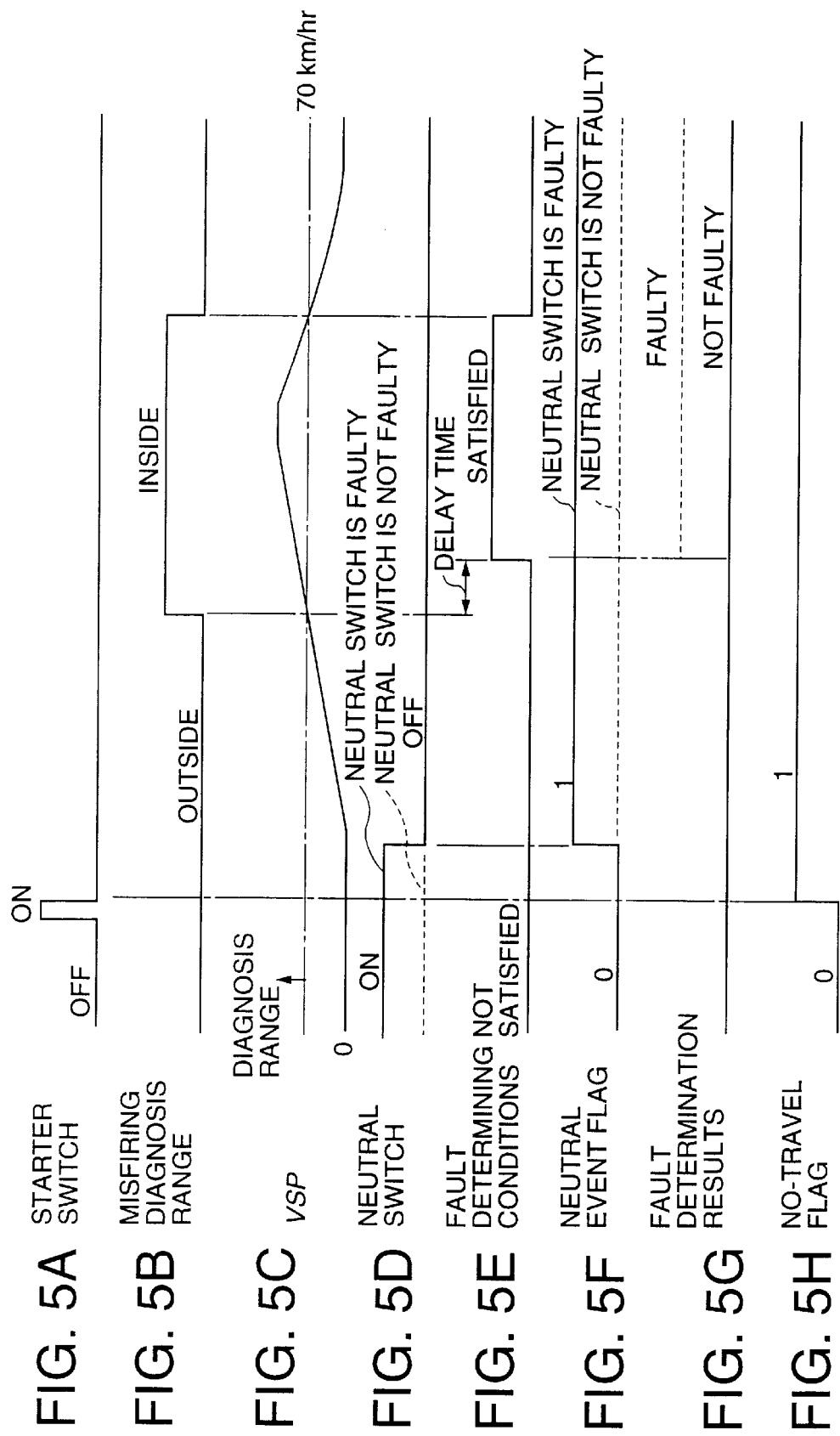
FIGS. 5A–5H are similar to FIGS. 4A–4H, but showing results obtained when the engine is restarted after the vehicle has stopped.

FIG. 5G shows the results of fault determination of the neutral switch 8 when the engine is started from when the vehicle is at rest. In this case as shown in FIGS. 5A and 5C, the vehicle speed is 0 when the starter switch is changed over from ON to OFF, so the no-travel flag is set to "1" as shown in FIG. 5H.

Consequently as shown in FIG. 5E, after neutral switch fault determining conditions are established, a test result is obtained corresponding to the value of the neutral event flag shown in FIG. 5F.

Figure 6:
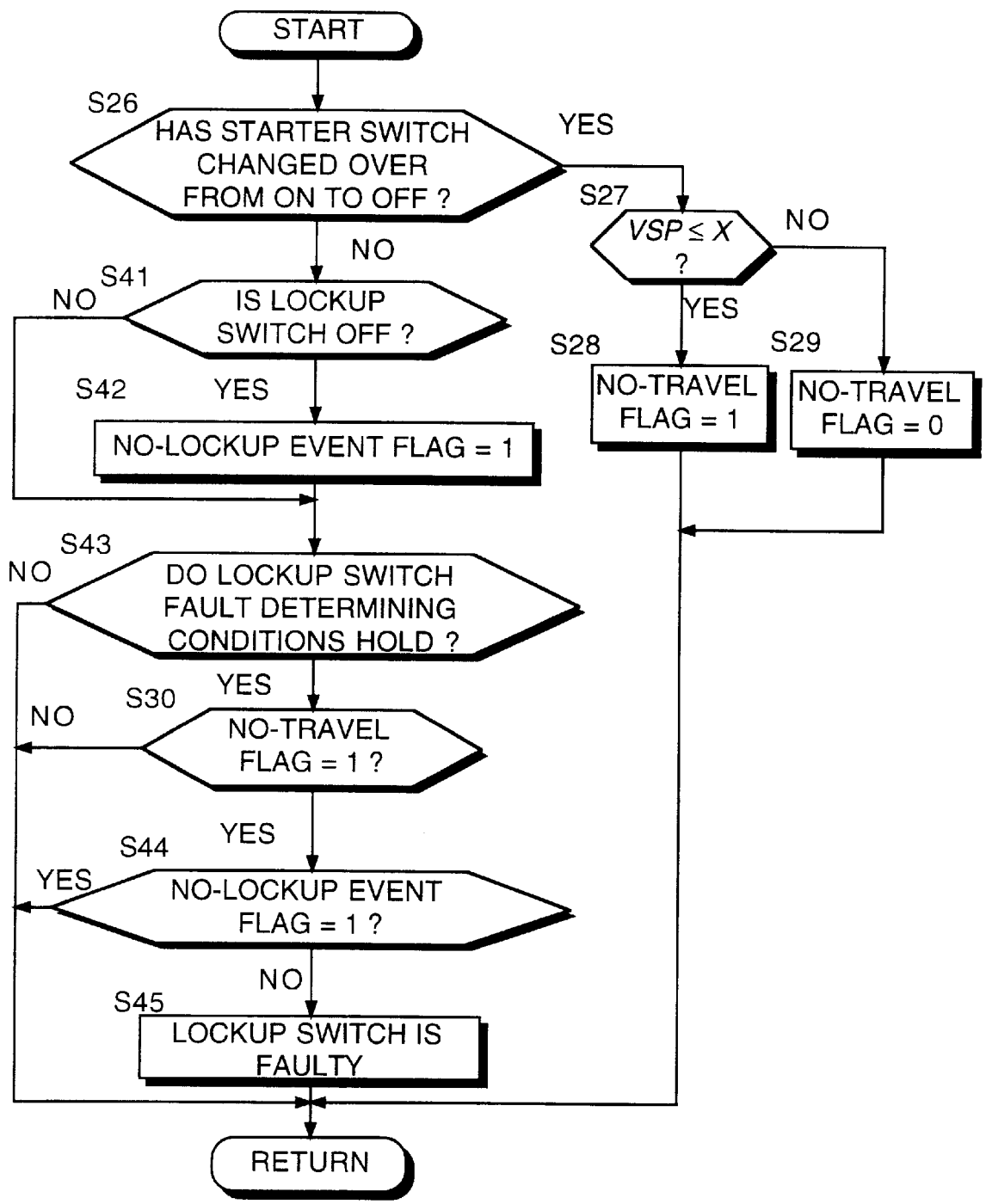
FIG. 6 is a flowchart describing a lock-up switch fault determining process according to this invention.

When the lockup switch 17 is used instead of the neutral switch 8, the control unit 7 determines the fault of the lockup switch 17 by the process shown in FIG. 6. In this flowchart, the same steps as those in the process for fault determination of the neutral switch 8 are assigned identical numbers.

It should be noted that whereas the neutral switch 8 is fault determined for a break in the wiring, the lockup switch 17 is fault determined for a short circuit.

A no-lockup event flag shown in steps S41, S44 of FIG. 6 corresponds to the neutral event flag of the steps S22, S24 of FIG. 3. The no-lockup event flag is reset to "0" when the starter switch 13 is changed over from ON to OFF, and is set to "1" in a step S42 when the lockup switch 17 is switched ON.

Fault determination of the lockup switch 17 is performed only when the fault determining conditions for the lockup switch 17 hold in the step S43, and only when it is also determined that the no-travel flag is "1" in the step S30.

Herein, when the no-lockup flag is "0", it is determined that a fault has occurred due to a short circuit in the lockup switch 17.

When the no-lockup event flag is "0" it signifies that the lockup switch 17 was always ON, i.e. that the output shaft 15 and drive shaft 16 were mechanically connected, from when the engine 1 started when the vehicle was at rest to when the fault determining conditions for the lockup switch 17 came to hold. To start the engine 1 from when the vehicle is at rest, the output shaft 15 and drive shaft 16 must be disengaged. In this case, the lockup switch 17 should be OFF, otherwise it is determined that a fault has occurred due to a short circuit in the lockup switch 17.

Even in this fault determining process, testing is not performed when the no-travel flag is "0", so the trouble caused by an incorrect determination of a fault in the lockup switch 17 when he engine 1 is restarted in the lockup state while the vehicle is running, can therefore be avoided.

The embodiments of this invention in which an exclusive property or privilege is claimed are defined as follows:

What is claimed is:

1. A device for determining a fault in a sensor used for detecting whether or not a vehicle engine output shaft and a vehicle drive shaft are in a predetermined state of drive connection and for outputting a signal indicative of a drive connection state in response to the state of drive connection being detected, comprising:

means for determining whether or not a predetermined condition necessary for fault determining exists, means for determining when the engine started and when the predetermined condition came into existence, means for determining that a fault has occurred in the sensor when the engine output shaft and the vehicle drive shaft are indicated by the signal from the sensor as being constantly in the drive connection state from the time when the engine is indicated as being started to the time when the predetermined condition is indicated as coming into existence, means for determining whether or not the vehicle is running, and means for prohibiting said fault determining means from determining that a fault has occurred in said sensor when said vehicle is detected as running at the time when the engine is started.

2. A fault determining device as defined in claim 1, wherein said vehicle running determining means comprises:

means for detecting vehicle speed, and means for determining that the vehicle is not running when the vehicle speed is less than a predetermined value.

3. A fault determining device as defined in claim 1, wherein the vehicle comprises a transmission for selectively shifting between a running position in which a rotation of the engine output shaft is transmitted to the vehicle drive shaft, and a neutral position in which the rotation of said engine output shaft is not transmitted to said vehicle drive shaft, and wherein said sensor comprises a switch which responds to the transmission being in the neutral position.

4. A fault determining device as defined in claim 1, wherein the vehicle comprises a lockup clutch for mechanically connecting the engine output shaft and an input shaft of an automatic transmission, and wherein the sensor comprises a switch which responds according to whether or not the lockup clutch is mechanically connecting the engine output shaft and the transmission input shaft.

5. An engine misfiring diagnosis device for measuring a time required for the engine to rotate through a predetermined angle corresponding to a combustion process of the engine, and determining engine misfiring based on a variation of the required time, comprising:

means for determining whether or not an engine output shaft and a vehicle drive shaft are in a predetermined state of drive connection and outputting a signal indicative thereof, means for determining whether or not a predetermined condition suitable for fault determination exists, means for determining when the engine started and when the predetermined condition came into existence, means for determining that a fault has occurred in the device when the engine output shaft and the vehicle drive shaft are indicated by the signal from the sensor as being constantly in the drive connection state from the time when the engine started to the time when the predetermined condition is indicated as having come into existence, means for prohibiting the engine misfiring determining when a fault is indicated as having occurred in the sensor, means for determining whether or not the vehicle is running, and means for prohibiting fault determining by said fault determining means when the vehicle is detected as running at the time when the engine started.

6. An engine misfiring diagnosis device as defined in claim 5, wherein said vehicle running determining means comprises:

means for detecting vehicle speed, and means for determining that the vehicle is not running when the vehicle speed is less than a predetermined value.

7. An engine misfiring diagnosis device as defined in claim 5, wherein the vehicle comprises a transmission for selectively shifting between a running position in which a rotation of the engine output shaft is transmitted to the vehicle drive shaft, and a neutral position in which the rotation of said engine output shaft is not transmitted to said vehicle drive shaft, and wherein said sensor comprises a switch which responds to the transmission being in the neutral position.

8. An engine misfiring diagnosis device as defined in claim 5, wherein the vehicle comprises a lockup clutch for mechanically connecting the engine output shaft and the vehicle draft shaft, and the sensor comprises a switch which responds according to whether or not the lockup clutch is mechanically connecting the engine output shaft and the vehicle drive shaft.

* * * * *